No. 720,620. PATENTED FEB. 17, 1903.
W. L. ROPER.
LOCK NUT.
APPLICATION FILED AUG. 8, 1902.
NO MODEL.
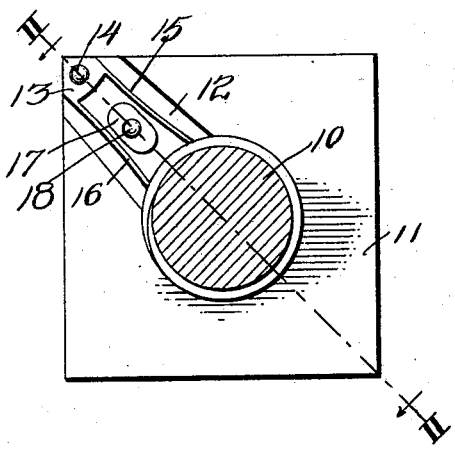
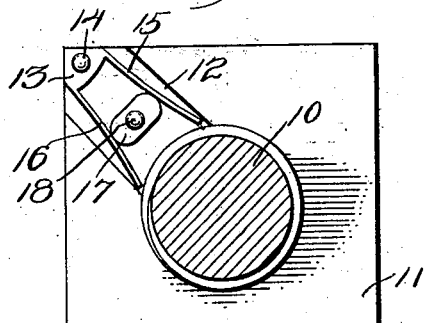
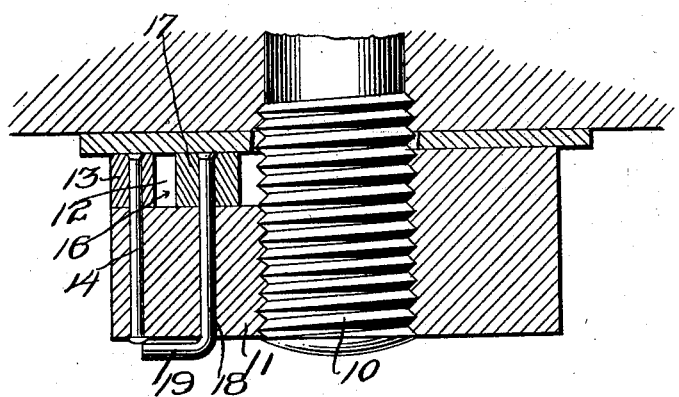
Witnesses
E. F. Stewart
C. N. Woodward
W. L. Roper, Inventor.
by C. A. Snow & Co.
Attorneys

UNITED STATES PATENT OFFICE.

WALTER L. ROPER, OF BILLINGSLEY, ALABAMA.

LOCK-NUT.

SPECIFICATION forming part of Letters Patent No. 720,620, dated February 17, 1903.

Application filed August 8, 1902. Serial No. 118,961. (No model.)

*To all whom it may concern:*

Be it known that I, WALTER L. ROPER, a citizen of the United States, residing at Billingsley, in the county of Autauga and State of Alabama, have invented a new and useful Lock-Nut, of which the following is a specification.

This invention relates to devices employed for locking nuts to bolts, and has for its object the production of a simple attachment to the bolt whereby the latter may be locked fast to the nut and readily released therefrom when required without injury to the bolt or weakening the bolt or nut; and the invention consists in certain novel features of the construction, as hereinafter shown, and specified in the claims.

In the drawings illustrative of the invention, Figure 1 is a bottom plan view of one of the improved lock-nuts with the bolt in transverse section and the locking mechanism in engagement with the bolt. Fig. 2 is a similar view with the locking mechanism disengaged. Fig. 3 is a sectional view, enlarged, on the line II II of Fig. 1.

The bolt is represented at 10 and the nut at 11, of the usual construction, except that the nut is preferably provided with a recess 12, radially disposed at its inner surface, the recess being preferably arranged through one corner of the nut when a square nut is employed, as shown.

The device is applicable to any of the various forms of nuts; but for the purpose of illustration it is shown applied to a square nut of the ordinary form; but I do not wish to be limited to any specific form of nut, as the device is equally applicable to all forms.

Within the recess 12 is movably arranged the locking mechanism by which the bolt is immovably connected to the nut, and this locking mechanism consists in a pawl having a head member 13 pivotally mounted on the nut by a pin 14 and having spaced side members or legs 15 16 extending therefrom, the side members being yieldable laterally and adapted to engage the threads of the bolt 10 by their free ends when in their normal position, as shown in Fig. 1.

The side members 15 16 will possess sufficient spring action to cause them when in their normal position to forcibly engage the threads of the bolt to effectually prevent the nut from being turned on the bolt.

The free ends of the members or legs 15 16 will be provided with relatively sharp edges, so that they will forcibly engage the threads of the bolt and resist any attempt at the movement of either the bolt or the nut in either direction, as will be evident by reference to Fig. 1, as it will be noted that the member 15 will effectually resist any movement of the nut in one direction and the member 16 will likewise effectually resist any movement of the nut in the opposite direction. This makes a very complete and simple locking mechanism, which will adapt itself to the movements of the nut and bolt.

To release the locking mechanism, it will be necessary to distend the members 15 16, as illustrated in Fig. 2, and the mechanism employed for this purpose consists in a double-sided cam disposed between the members and mounted upon a stud 18, extending through the nut and provided with an operating-handle 19 outside the nut, as shown.

When the cam member 17 is turned longitudinally of the members 15 16, or with its narrow diameter transversely thereof, it will be out of engagement with the side members and leave them free to engage the bolt, as shown. Then if the cam member be rotated one-fourth a revolution, or with its longer diameter transversely of the side members, as shown in Fig. 2, the latter will be distended and moved out of engagement with the threads of the bolt and the bolt thereby released.

The stem 18, it will be observed, is operative from outside the bolt by the handle member 19, and this handle member will preferably be as small as possible consistent with its operativeness, so as to offer the least possible obstruction above the bolt or the nut. This makes a very simple, easily-applied, and efficient means for locking the nut fast to the bolt, the locking mechanism being of sufficient strength to effectually resist any force to which the nut will be subjected to rotate it under ordinary conditions, while at the same time the locking means is very readily operated to release the nut when required by simply rotating the stem 18 one-fourth a revolution, and this rotation may be accomplished by any implement applied to the handle member 19.

The locking mechanism will never become released while in operation. Consequently the device will be very efficient and reliable for the purposes intended.

The device may be applied to any size of nut or bolt or to any shape of nut, as before stated.

The parts may be modified in minor particulars without departing from the spirit of the invention or sacrificing any of its advantages.

Having thus described the invention, what is claimed is—

1. A lock-nut having a pawl pivotally mounted thereon, said pawl having spaced spring-legs extending terminally into the bolt-hole and adapted to engage the bolt on opposite sides of a plane passing through the pivot of the pawl and the axis of the bolt.

2. A lock-nut provided with a pawl pivotally mounted thereon, said pawl having spaced spring-legs extending terminally into the bolt-hole and adapted to engage the bolt on opposite sides of a plane passing through the pivot of the pawl and the axis of the bolt, and a cam movably mounted on said nut between said spring-legs for engaging said legs to distend them.

3. In a lock-nut, a threaded bolt, a nut engaging the bolt, a yieldable locking mechanism movably engaging the nut and formed of spaced members forcibly engaging the threads of the bolt in opposite directions, and means operative between said spaced members for distending them and releasing the bolt, substantially as described.

4. In a lock-nut, a threaded bolt, a nut engaging the bolt, a locking mechanism consisting of a head member pivotally mounted on the nut and provided with yieldable spaced legs extending therefrom with their free ends normally engaging the bolt on opposite sides of a radial plane passing through the pivot of the head, and a cam operative between said spaced members and adapted to distend them to release the bolt, substantially as described.

5. In a lock-nut, a threaded bolt, a nut engaging the bolt, a locking mechanism consisting of a head member pivotally engaging the nut and provided with yieldable spaced side members extending therefrom with their free ends normally engaging the bolt in opposite directions, and a cam operative between said spaced members and having a stem extending therefrom through the nut and operative from the outside, whereby said side members may be distended to release the bolt, substantially as described.

In testimony that I claim the foregoing as my own I have hereto affixed my signature in the presence of two witnesses.

WALTER L. ROPER.

Witnesses:
S. B. RATLIFF, Sr.,
J. E. EVANS.